Nov. 11, 1930. E. B. TOLMAN, JR., ET AL 1,781,352
PNEUMATIC CONVEYER APPARATUS
Filed Dec. 19, 1927   3 Sheets-Sheet 2

Witness:
William P. Kilroy

Inventors
Edgar B. Tolman Jr.
Hans Brueckler
By Hill & Hill Attys

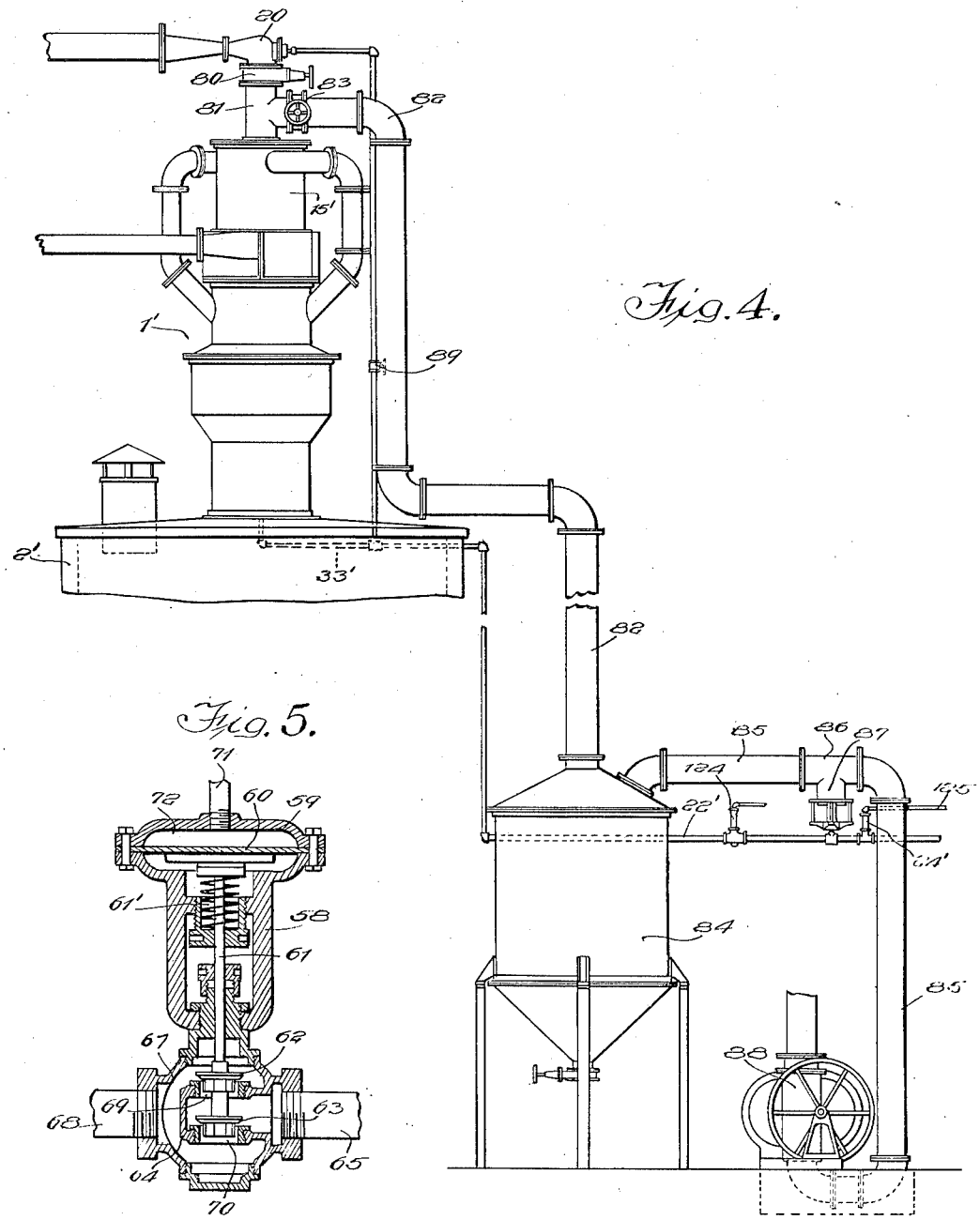

Patented Nov. 11, 1930

1,781,352

UNITED STATES PATENT OFFICE

EDGAR B. TOLMAN, JR., AND HANS BRUECKLER, OF CHICAGO, ILLINOIS, ASSIGNORS TO UNITED CONVEYER CORPORATION, OF CHICAGO, ILLINOIS, A CORPORATION OF ILLINOIS

PNEUMATIC CONVEYER APPARATUS

Application filed December 19, 1927. Serial No. 241,153.

This invention pertains to the general class of conveyers and particularly to the class of pneumatic conveyers. An object of applicants' invention is the production of a novel pneumatic conveyer for the purpose of collecting ashes, dust, shavings, or any other like material, separating said material from the conveying fluid and depositing said material into a suitable receptacle, or other means.

Among the important features of the invention are included the provision of an ejector exhauster operable to cause the material to be conveyed to and discharged into an intake chamber and an outlet valve or gate in the intake chamber adapted, when opened, to discharge the accumulated materials into a storage bin. A pipe or conduit connects the exhauster and the gate or valve with a source of expansive fluid under pressure. Valve means are operable to control the flow of fluid through the pipe and thereby to act in the dual capacity of regulating the operation of the exhauster and the opening and closing of the outlet gate. The exhauster is inactive when the outlet gate or valve is opened and can be active only when the valve is closed. The valve is utilized for intermittently discharging material from the intake chamber into the storage bin. The device provides for the gate being held closed when the exhauster is active and open when the exhauster is inactive. Another object of the invention is the provision of improved conveyer apparatus operable to simultaneously provide dual control of an exhauster and a discharge outlet.

A further object of applicants' invention is the production of novel means for separating said material from the conveying fluid. A further object of applicants' invention is the production of novel means for placing the conveying fluid in motion. A further object of applicants' invention is the production of novel means for discharging said material from said conveyer after separation from the conveying fluid.

Many other objects and advantages of the construction herein shown and described will be obvious to those skilled in the art from the disclosure herein given.

To this end our invention consists in the novel construction, arrangement and combination of parts herein shown and described, and more particularly pointed out in the claim.

In the drawings, wherein like reference characters indicate like or corresponding parts:

Fig. 4 is an elevation of another form of the invention; and

Fig. 5 is a sectional elevation of a valve member.

Figure 1:
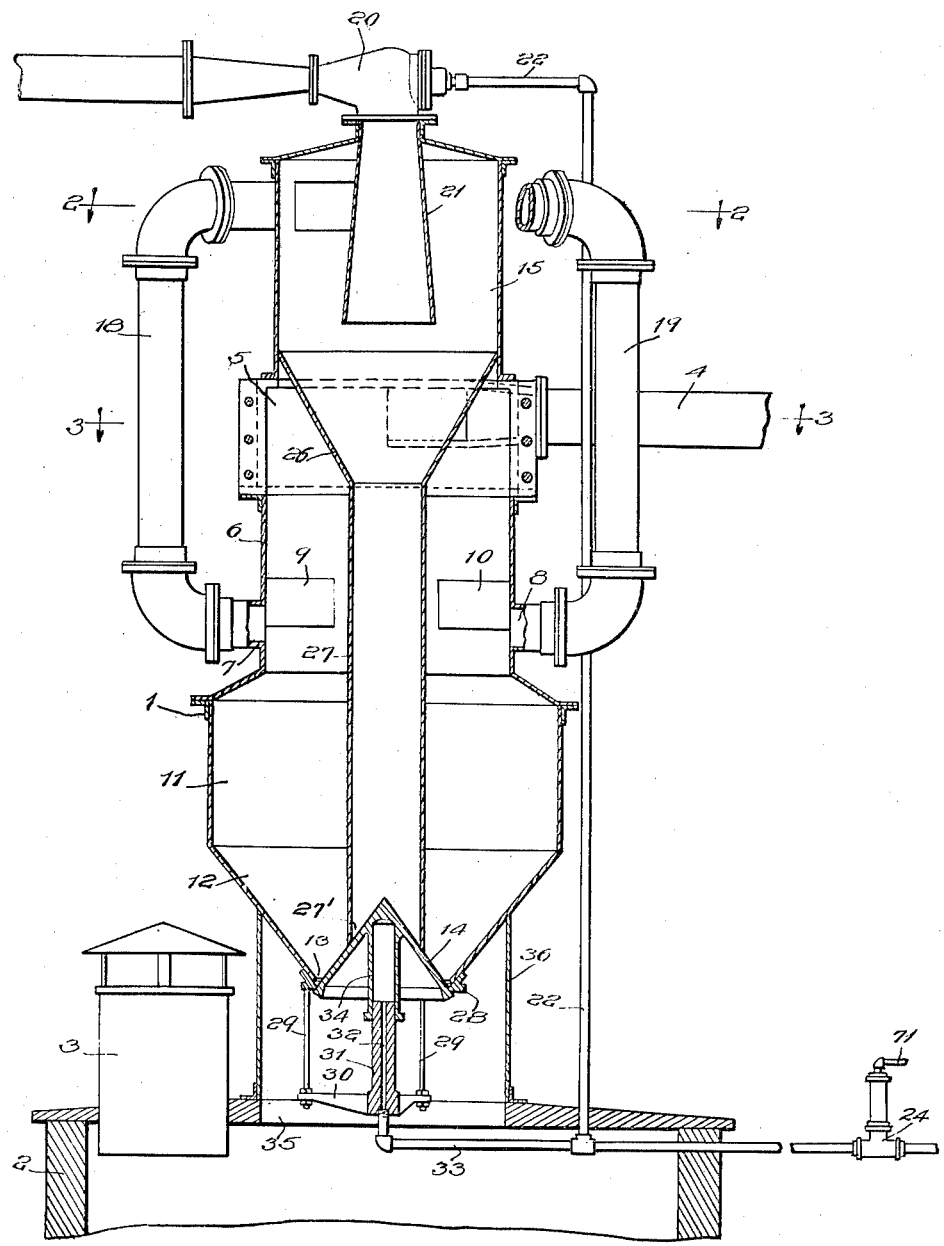
Fig. 1 is a sectional elevation of one form of applicants' novel conveyer.
Figure 2:
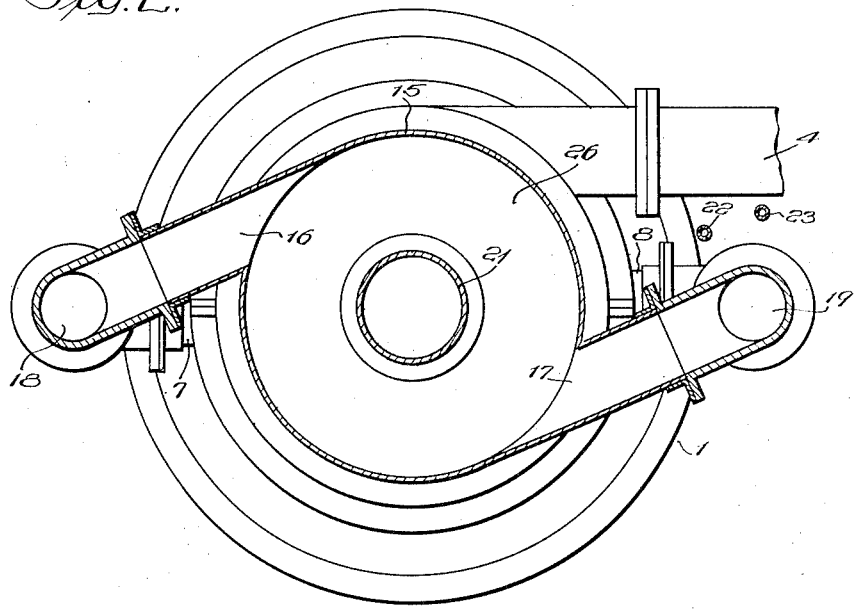
Fig. 2 is a section taken on line 2—2 of Fig. 1.
Figure 3:
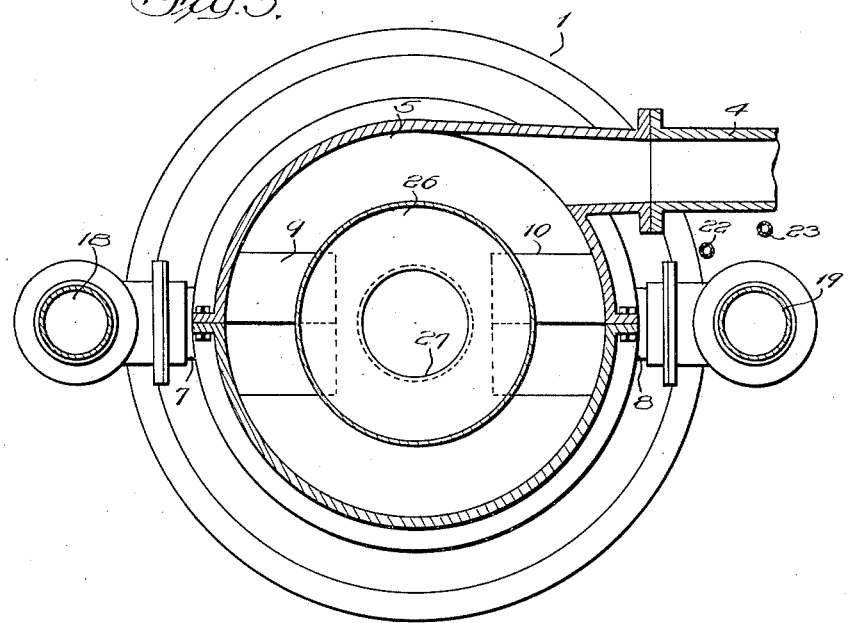
Fig. 3 is a section taken on line 3—3 of Fig. 1.

Referring now to Fig. 1, 1 shows a conveyer mounted upon a storage bin 2, said storage bin being shown with a vent 3. The conveyer 1 has an intake pipe 4 which leads into an intake chamber 5 more or less tangentially, as shown. The walls of the intake chamber 5 are preferably of a very hard material such as white cast iron in order to resist any abrasion due to the material coming in contact therewith. Below chamber 5 is a body section 6 shown with outlet openings 7 and 8. Above outlets 7 and 8 are shields 9 and 10, respectively. Below the body section 6 is storage chamber 11 shown enlarged in order to increase its capacity. The bottom 12 of storage chamber 11 is preferably converging as shown and provided with an opening 13. Opening 13 is shown closed by a valve member 14, the construction and operation of which will be hereinafter set forth. Above the receiving chamber 5 is a dust separating chamber 15 shown with inlet openings 16 and 17 which are positioned more or less tangentially as best shown in Fig. 2. Inlet opening 16 is connected with opening 7 by pipe 18 and opening 17 is connected with opening 8 by pipe 19. It is readily seen that material entering dust separating chamber 15 from body section 6 through pipes 18 and 19 has a whirling motion imparted thereto.

The purpose of this whirling or centrifugal action is to separate dust and other particles from the fluid. Above dust separating chamber 15 is an ejector exhauster 20 with intake pipe 21 extending downward into the separating chamber preferably below the inlets 16 and 17 as shown. Exhauster 20 may be of any type operable by fluid pressure, that shown being of Venturi tube construction. Leading to exhauster 20 is a pipe line 22 having a control valve 24 interposed between said exhauster and a source of fluid pressure. The particular construction of these control valves will be hereinafter set forth.

In the bottom of separating chamber 15 is a more or less funnel-shaped member 26 which connects to a pipe 27 leading downward through storage chamber 11. Material separated in separating chamber 15 drops downward into the converging member 26 and deposits into the pipe 27. Valve member 14 closes the bottom of pipe 27 as well as the bottom of storage chamber 11. At the bottom of storage chamber 11 is shown an annular member 28 positioned about the opening 13. Rod-like supports 29 extend downward from member 28 and support a spider 30. Spider 30 adjacent its center supports a piston 31 which forms an air lock for the member 14. Piston 31 has a longitudinal bore 32 extending therethrough. One end of said bore is connected to extension 33 of pipe 22. Piston 31 fits into the cylindrical member 34 attached to the bottom of the valve member 14. Valve member 14 is preferably conical on its upper surface as shown. However, it is obvious that other geometrical shapes may be employed. The storage bin 2 is shown with an opening 35 in the top portion thereof which is directly below the valve member 14. About the opening 35 and resting on the storage bin 2 is shown a supporting member 36 which supports the receiver 1. It is obvious, however, that any other means of mounting the receiver may be employed, if desired. Control valve 24 is shown in cross section in Fig. 5. The control valve includes a casing 58 with enlargement 59 in which is positioned a diaphragm 60. To one side of diaphragm 60 is connected a rod 61, at the other end of which are attached valve members 62 and 63. Valve members 62 and 63 cooperate with a complementary valve member 64 which is in the form of a chamber as shown. Valve member 64 connects to pipe 65. Chamber 67 about valve member 64 is connected to pipe 68. Upon the downward movement of the diaphragm 60 and rod 61 valve members 62 and 63 close openings 69 and 70, respectively, in the valve member 64. Diaphragm 60 is depressed by means of pressure fluid entering through pipe 71 into chamber 72 formed between diaphragm 60 and the upper part of enlargement 59 of casing 58. When the pressure on the fluid is released, the diaphragm returns to its normal position with the aid of a spring 61' and the valve member is opened to allow the flow of fluid therethrough. The pressure on the valve 24 may be controlled from a remote point and preferably at the point from which the material is to be conveyed or can be controlled at regular predetermined intervals by mechanical means.

The operation of the device is as follows: When the device is not in operation, valve 24 is closed and held closed by pressure fluid in the pipes 71. The pressure in the pipes 71 is remotely controlled as previously set forth. Upon the opening of valve 24, pressure fluid passes through same and into extension 33 of pipe 22 into bore 32 of piston 31 and moves valve member 14 upward to close opening 13 in the bottom of storage chamber 11 and opening 27' in the bottom of pipe 27. Pressure fluid also rises through pipe 22 and passes into exhauster 20, thus exhausting air directly from chamber 15 and then through pipes 18 and 19 from the interior of the conveyer and then through pipe 4 to the source of the material. As the material enters pipe 4, same is conveyed into receiving chamber 5 by force of the moving air. The material enters chamber 5 more or less tangentially and is given a whirling motion. The larger particles are thrown outward by centrifugal force and separated from the moving air and dropped downward into storage chamber 11. The downward falling material is prevented from passing close to the openings 7 and 8 by means of the shields 9 and 10. Air passing through pipes 18 and 19 is more or less dust laden and enters dust separating chamber 15 more or less tangentially. It is thus given a whirling motion. The dust and other material present in the air are separated in the chamber 15 and drop downward into pipe 27. The cleaned air passes outward through pipe 21 and through exhauster 20. When the storage bin 11 and pipe 27 contain a considerable amount of material or when all of the material has been moved, the valve 24 is closed by fluid pressure, thus shutting off the exhauster and allowing the valve member 14 to move downward on piston 31. The bottoms of storage chamber 11 and pipe 27 are thus opened and the material therein drops into the storage bin 2. When the device is again placed in operation, the valve member 14 moves upwardly as previously explained. A portion of the operation thus described as occurring by the provision of pipes 18 and 19 and the chamber 15 is a refinement upon, and secondary to, the essential operations of our invention and is provided for the purpose of cleaning the air of floating dust particles. This secondary operation is not essential to the major or primary operation, the outstanding feature of which is the dual action, by reason of which the gate or valve 14 closes when the exhauster 20 is active and opens when the exhauster becomes inactive. The control valve 24 may either be turned off and on manually or this operation may be performed mechanically, such, for instance, as by a cam driven through reducing gears by an electric motor or other source of power.

In the form shown in Fig. 4, the conveyer 1' is similar in all respects to the conveyer 1 shown in Fig. 1 with the additional provision that same may be operated either by a blower or pump or by the exhauster 20. Between the dust separating chamber 15' and the exhauster 20 is placed a valve 80 and pipe T 81. To the pipe T 81 is connected a pipe 82 in which is positioned a valve 83 adjacent the pipe T. Pipe 82 leads to an air washer 84 of conventional design. From air washer 84 leads a pipe 85 in which is a valve member 86. Valve member 86 is preferably operated similar to the valve member 14 at the bottom of storage chamber 11, same allowing air to enter pipe 85 through an opening 87 in valve 86 when pressure in pipe 22' has been released. The opening 87 is closed when fluid pressure enters pipe 22' through control valve 24'. Pipe 85 leads to blower or pump 88. Pipe 22' is in all respects similar to pipe 22 shown in Fig. 1 except for the connection to valve member 86 and the insertion of a valve 89 in a portion thereof between the point of connection of extension 33' and the exhauster 20. The purpose of the valve 89 is to keep steam from entering the exhauster 20 when the blower or pump 88 is used to exhaust air from the receiver 1. It is thus seen that the form shown in Fig. 6 may be used either with the exhauster 20 or the pump or blower 88. When the exhauster 20 is employed, valve 83 is closed, valve 80 is opened and the valve 89 is opened. Blower 88 is not in operation; thus the opening and closing of valve 86 is immaterial. The flow of pressure fluid through the exhauster 20 is controlled by control valve 24'. When the blower or pump 88 is used as an exhauster, valve 80 is closed, valve 83 is opened and valve 89 is closed. Pump or blower 88 is placed in continuous operation. The periodic flow of air from receiver 1' through pipe 82, washer 84 and pipe 85 is controlled by valve 86. When valve 24' is opened, valve 86 closes together with valve 14 in the bottom of conveyer 1' (not shown). Air is now exhausted from receiver 1'. When it is desired to dump the material from the conveyer, valve 24' is closed. The pressure in the remote control line 125 not only closes valve 24' but opens valve 124 which relieves the pressure in pipe 22'. This action opens valve 86 and allows air to enter pipe 85. The flow of air through the receiver 1' ceases. Valve 14 also opens and allows the material to drop into storage bin 2'.

It is thus seen that an efficient device is provided highly satisfactory for its intended purpose.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

In a device of the kind described, a compartment for receiving and storing material conveyed by a fluid, said compartment having an outlet opening through which stored material discharges by gravity, fluid actuated means operable to separate the conveying fluid from the material conveyed, a closure member for said outlet opening, said closure member comprising a vertically movable valve having a downwardly projecting cylinder, a pipe line having one end forming a piston fitting within said cylinder and the other end connected with a supply of fluid under pressure, and valve means operable to control the flow of pressure fluid through said pipe line whereby said closure member opens by gravity when said valve means is closed and is lifted to seated position when said valve means is open.

In testimony whereof, we have hereunto signed our names.

EDGAR B. TOLMAN, Jr.
HANS BRUECKLER.